United States Patent
Yang et al.

(10) Patent No.: US 6,396,883 B2
(45) Date of Patent: May 28, 2002

(54) METHOD FOR DETECTION OF PILOT TONES

(75) Inventors: Bin Yang; Ralf Hartmann, both of Munich (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/930,411

(22) Filed: Aug. 15, 2001

Related U.S. Application Data

(63) Continuation of application No. PCT/DE00/00301, filed on Feb. 1, 2000.

(30) Foreign Application Priority Data

Feb. 15, 1999 (DE) .......................................... 199 06 293

(51) Int. Cl.$^7$ ........................... H04L 27/06; H04L 7/00; H04L 7/06
(52) U.S. Cl. ........................ 375/340; 375/363; 375/364; 370/526
(58) Field of Search ................................ 375/340, 362, 375/363–366, 368; 370/526, 503

(56) References Cited

U.S. PATENT DOCUMENTS

| | | | |
|---|---|---|---|
| 5,343,497 A | | 8/1994 | Canosi et al. ................ 375/354 |
| 5,872,774 A | * | 2/1999 | Wheatley, III et al. ..... 370/503 |
| 6,151,311 A | * | 11/2000 | Wheatley, III et al. ..... 370/503 |

FOREIGN PATENT DOCUMENTS

JP  09 312 640  12/1997

OTHER PUBLICATIONS

Je Gil Koo et al., "Enhanced Vhannel Estimation for W–CDMA forward link using Pilot symbols over Rayleigh–fading multipath channels," IEEE, 2000, pp 2454–2458.*
Jin Yang et al., "PN Offset Planning in IS–95 Based CDMA System," IEEE 1997, pp. 1435–1439.*
Georg Frank et al.: "Anfangssynchronisation der Mobilstation im D–Netz" (Start Synchronization of the Mobil Station in D–Netz), PKI Tech. Mitt. 1, dated Jan. 1990, pp. 43–49.
M. K. Haldar et al.: "Digital Frequency Discriminator", Electronics Letters, vol. 15, No. 16, dated Aug. 2, 1979, pp. 489–490.
Gilles Charbit et al.: "Frame Synchronisation and Frequency–Carrier Estimation for GSM Mobile Communications", NEC Technologies ltd, vol. 145, dated Sep. 30, 1997, pp. 449–457.
Hermann Neuner et al.: "Synchronisation einer Mobilstation im GMS–System DMCS 900 (D–Netz)" (Synchronization of a Mobile Station in GMS TDMA Mobile Radio Communication System DMCS 900 (D–Netz), Frequenz, vol. 47, dated 1993, pp. 66–72.

* cited by examiner

*Primary Examiner*—Tesfaldet Bocure
(74) *Attorney, Agent, or Firm*—Laurence A. Greenberg; Werner H. Stemer; Ralph E. Locher

(57) ABSTRACT

A method identifies a pulse sequence having known values and a known length in a signal. According to this method, the mathematical sign of the phase difference between samples of the signal is used to estimate whether the transmitted pulse is a 1 or a 0. Undersampling, carried out to a selectable extent, produces a relatively insensitive response to adjacent channel interference. The sum of the pulses in a window which is proportional to the length of the pulse sequence and to the extent of the undersampling is determined, with the pulse sequence being regarded as being identified at the point in time at which the sum of the pulses in this search window exceeds a threshold value.

7 Claims, 2 Drawing Sheets

METHOD FOR DETECTION OF PILOT TONES

CROSS-REFERENCE TO RELATED APPLICATION

This application is a continuation of copending International Application No. PCT/DE00/00301, filed Feb. 1, 2000, which designated the United States.

BACKGROUND OF THE INVENTION

Field of the Invention

The invention relates to a method for detection of pilot tones. Pilot tones are sinusoidal oscillations at a known frequency, which are used, for example, in communications systems, in particular in mobile radio systems. A frequent task that occurs in such mobile radio systems is to search for pilot tones.

For example, in digital mobile radio systems that operate in accordance with the GSM/DCS1800/PCS1900 Standard, the radio traffic is organized into organization channels. For a mobile station to set up a connection to the network via a fixed station, it first needs to detect and search for this organization channel. The organization channel is detected by searching for specific pulse sequences, which identify this organization channel.

In the system cited above, pulse sequences are referred to as frequency correction bursts (FCB) and have a sequence of 148 zeros.

In the system under consideration here, the GMSK modulation method (Gaussian Minimum Shift Keying) is used for transmission. In this case, a carrier frequency FT (for example 900 MHz) is modulated with the signal to be transmitted, that is to say in this case, in particular, also with the FCB signal which is of specific interest. The resultant frequency is FT+67.7 kHz, that is to say 67.7 kHz above the carrier frequency. The FCB pulse sequence of 148 zeros is thus converted to a pure sinusoidal signal. In the baseband, this means that the phase difference between adjacent samples is ideally (without channel distortion or noise) ninety degrees (90°), if it is assumed that sampling takes place at the bit clock rate (4*67.7=270.8 kHz).

Various methods for FCB searching are known from the prior art. For example, the article "Anfangssynchronisation der Mobilstation im D-Netz" [Initial synchronization of mobile stations in the D network] by G. Frank and W. Koch, PKI Tech. Report 1 (1990), pages 43–49 describes one method for FCB searching. In this method, the FCB search starts with a frequency shift by multiplying all the (I,Q) samples of the received signal by exp(−jkΠ/2). Each sample Z at the time k can be represented, as a complex number, in the form Z(k)=I(k)+jQ(k). This means that the received signal is shifted downward by 67.7 kHz, so that its midfrequency after frequency shifting is 0 Hz. The signal is then low-pass filtered. If this is the FCB signal, then it passes through the filter; other signals are largely suppressed due to their wide bandwidth. The magnitude of the filtered signal is then formed, ideally resulting in an approximately rectangular pulse of the same duration as an FCB signal. In contrast to this, the modulation with random data bits in the rest of the time results in a signal similar to noise. An optimum search filter can be specified for the approximately rectangular pulse. This corresponds to sliding averaging over the time period of an FCB. An FCB is regarded as having been found when the maximum value of the filtered signal exceeds a previously defined threshold. The position of the maximum value marks the end of the detected FCB signal.

The method described in this article has the disadvantage that the maximum value of the filtered signal depends on the instantaneous signal amplitudes, and is therefore subject to severe fading fluctuations. Therefore, adaptive amplitude control is required for a reliable FCB search. The low-pass filter also must have a high Q factor; therefore, its construction is complex. Furthermore, this method is highly sensitive to frequency mistuning between the mobile station and base station. Thus, in practice, the maximum value has to be averaged over a number of observation intervals.

A further method is described in the article "Synchronisation einer Mobilstation im GSM-System DMCS 900 (D-Netz)" [Synchronization of a mobile station in the GSM DMCS 900 system (D network)] by H. Neuner, H. Bilitza, S. Gärtner in Frequenz [Frequency] 47 (1993) 3–4, pages 66–72. In this method, the phase difference between every fourth sample of the received signal is evaluated. The method is based on the observation that, ideally, such phase differences are zero for the duration of an FCB signal. Since, as already stated above, the phase difference between two adjacent samples is 90°, the phase difference between four samples is 4×90=360°, or 0°. Interference (fading) is taken into account with a validity range, which is recalculated for each phase difference. An FCB signal is regarded as having been found when a sufficiently large number of negligibly small phase differences occur.

One problem with this method is determining the position of the FCB signal because only every fourth sample is evaluated. Because the method described here makes it necessary to determine the phase difference between samples, the arctan function must be used in order to calculate the phase of the sample from the quadrature components of the sampled received signal. However, virtually no signal processors provide any hardware support for this, so that the calculation is approximated by a complex series development, which requires a considerable amount of computation time.

A third method from the prior art is a method that was developed by Dr. Ralf Hartmann at Siemens AG, which is similar to the Frank and Koch method. This method uses two frequency-selective filters, one of which filters passes FCB signals at the frequency 67.7 kHz without any attenuation, while the other filter completely blocks FCB signals. Magnitudes, and then sliding averages, are formed from both filtered signals. The quotient of the two averages is then formed, and is compared with a previously defined threshold value. If the quotient is below the threshold value, then an FCB is regarded as having been found. The position of the quotient minimum marks the end of the FCB signal.

This method already has been used successfully in chip sets for GSM mobile telephones. Because the quotient formation process results in insensitivity to amplitude fluctuations, the amplitude control required in the Frank and Koch method is not necessary. However, the division process required for quotient formation likewise still requires a relatively large amount of computation time. Furthermore, the method is sensitive to frequency mistuning. In the event of frequency mistuning, one filter can no longer pass the signal through completely, while the other filter no longer completely blocks the signal. This means that the quotient minimum value rises considerably and the threshold value, which is configured for the best case of minimum frequency mistuning, is no longer suitable, so that the entire FCB search becomes uncertain.

A further method for searching for such pilot tones is known from German Patent Application DE 197 43 191, corresponding to U.S. patent application Ser. No. 09/539,239 filed on Mar. 30, 2000. The inventors are named R. Hartmann and B. Yang and the invention is entitled, "Verfahren zur Suche nach Pilottönen," [Method for searching for pilot tones] (date of application Sep. 30, 1997). This method uses what is referred to as differential symbol estimation. In this case, the exact phase differences between successive (I,Q) samples of the received signal are not determined, as in the method by Neuner, Bilitza, and Gartner. Instead of this, all that is investigated is to determine whether the phase differences between successive samples are in the interval (0, Π) or (-Π, 0). Both cases correspond to a transmitted symbol of 1 ("+1") or 0 ("-1") from the GMSK modulator. Because a FCB signal has 148 zeros is changed to 147 ones after differential coding at the transmitter end, and a virtually equal number of ones and zeros occur outside the FCB signal, then it is possible to search for an FCB signal by searching for a long, cohesive block of ones.

The advantage of the differential symbol estimation is its simple implementation. If I(k) represents the in-phase component and Q(k) represents the quadrature component of the baseband sample at the time k, then, in this method, the mathematical sign of the expression $Q(k)*I(k-1)-I(k)*Q(k-1)$ ideally reflects the transmitted signal exactly. Because fading of the sampled signal occasionally leads to false symbol estimates, the estimated symbols (1 or 0) are filtered using what is referred to as a match filter. This means that a search window of fixed length is placed over the estimated symbols and the number of ones within the window is counted, in the form of a sliding addition process. The maximum of the signal filtered in this way is then compared with a threshold value, and the presence of an FCB signal is deduced if the threshold value is exceeded.

This additional filtering makes the method described there for searching for pilot tones relatively insensitive to amplitude fluctuations, to a poor signal-to-noise ratio and to frequency mistuning. However, interference from an adjacent channel does represent a problem with this algorithm. If nothing is currently being transmitted in the frequency channel on which a search is currently being carried out for a pilot tone, that is to say for an FCB signal, but a powerful broadband signal is being transmitted on the adjacent channel, then residues from this signal can frequently also be found in the frequency channel to be investigated. This residual signal can then be confused with a pilot tone in the form of an FCB pulse sequence in the investigated frequency channel.

SUMMARY OF THE INVENTION

It is accordingly an object of the invention to provide a method for detection of pilot tones that overcomes the hereinafore-mentioned disadvantages of the heretofore-known devices of this general type and that improves the above method of differential symbol estimation such that it is not sensitive to interference from adjacent channels.

With the foregoing and other objects in view, there is provided, in accordance with the invention, a method for identification of a pulse in a signal. The first step of the method is obtaining samples of a signal at successive times k. The sample times has a time difference of $\Delta k \geq 2$ between the sample times k. The signal includes a pulse sequence having known values 0 and 1 and a known length. The next step is corresponding an estimated symbol "1" to a phase difference of the signal when the phase difference is in a range mod $(\Delta k*\Pi/2.2)$ $-\Pi/2$ to mod $(\Delta k*\Pi/2.2\Pi)+\Pi/2$, and corresponding an estimated symbol "0" to the phase difference when the phase difference is not in the range. The next step is filtering the estimated symbols by placing a search window with a search window length equal to the known length of the pulse sequence to be identified minus $(\Delta k+1)$ over the successively estimated symbols, and by in each case forming a symbol sum of the estimated symbols within the search window. The next step is comparing the symbol sum with a sum threshold value. The next step is indicating a sought pulse sequence and a timing of the sought pulse sequence when the symbol sum is at least equal to the sum threshold value.

In accordance with a further mode of the invention, the method includes, before obtaining samples, subjecting the samples to DC voltage compensation.

In accordance with a further mode of the invention, in the method, $\Delta k$ equals 2.

In accordance with a further mode of the invention, in the method, $\Delta k$ equals 5.

In accordance with a further mode of the invention, the pulse sequence to be identified is a sequence of 148 zeros. Such a pulse sequence can identify an organization channel in a mobile radio system.

In accordance with a further object of the invention, the timing of the sought pulse sequence occurs midway between a first time and last time at which the symbol sum exceeds the sum threshold value.

The method according to the invention uses the idea of undersampling, in which, instead of using successive (I,Q) samples, samples located further apart from one another are used to calculate the phase differences. Such undersampling artificially increases overlapping (aliasing) of the residual signal spectra from an adjacent channel. This aliasing changes an originally colored residual signal spectrum to an approximately white spectrum. The residual signal thus behaves like noise and then has scarcely any similarity with the sought FCB signal. The FCB signal itself has a narrowband spectrum that is scarcely influenced by the aliasing effect.

Other features which are considered as characteristic for the invention are set forth in the appended claims.

Although the invention is illustrated and described herein as embodied in a method for detection of pilot tones, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Description of the Preferred Embodiments

Figure 1:
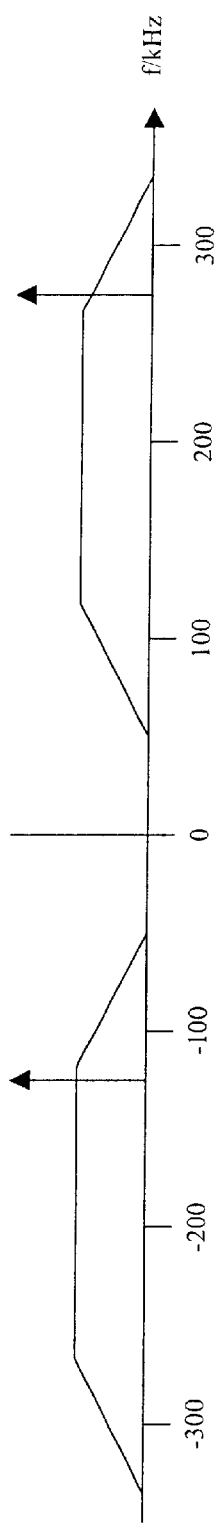
FIG. 1a is a graph plotting the upper and lower adjacent channel of thee investigated channel with their respective signal spectra.
FIG. 1b is a graph plotting the amplitude response of the baseband filter in the mobile station.
FIG. 1c is a graph plotting the residual signal spectra after baseband filtering.
Figure 1:
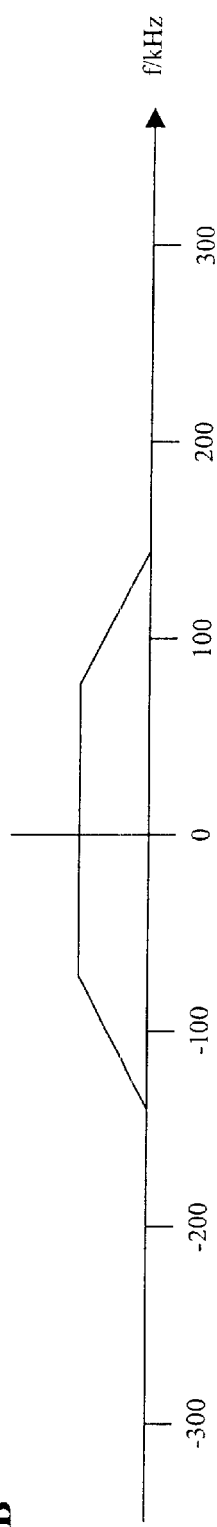
Figure 1:
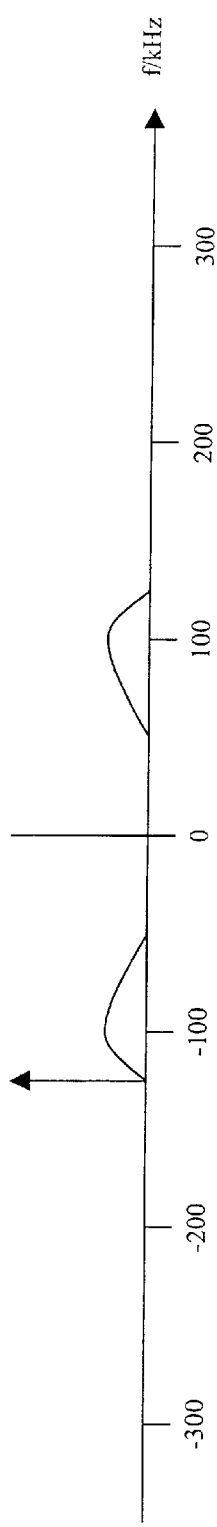

In all the figures of the drawing, sub-features and integral parts that correspond to one another bear the same reference symbol in each case.

Referring now to the figures of the drawings in detail and first, particularly to FIGS. 1a to 1c thereof, there is shown the problems of interference in the investigated channel from its adjacent channels.

FIG. 1a shows the situation in which no signal is being transmitted on the channel m to be investigated: that is, to say the channel on which a search for a pilot tone is intended to be carried out. Simultaneously, a powerful broadband signal is being transmitted on its lower adjacent channel m−1 and on its upper adjacent channel m+1. The frequency channel separation is 200 kHz in mobile radio systems that comply with the GSM/DCS1800/PCS1900 Standard. The FCB signal in the lower channel m−1 and in the upper channel m+1 is in each case represented as a vertical line, with an arrow on it.

FIG. 1b shows the amplitude response of the baseband filter in the mobile station. The mobile station is searching for the pilot tone.

FIG. 1c shows the result that is obtained when the signals shown in FIG. 1a are filtered using a baseband filter that has the amplitude response shown in FIG. 1b. As can be seen, the baseband filter is not able to completely suppress the broadband signals from the two adjacent channels and the FCB signal from the lower adjacent channel. Unfortunately, the broadband residual signal from the upper adjacent channel occurs in a frequency band in which the FCB signal for the channel m can also be found. The method described in Patent Application DE 197 43 191, which was mentioned above, for searching for pilot tones can thus not distinguish such a residual signal from the FCB signal in its own channel, and the residual signal would be incorrectly detected as an FCB signal.

Figure 2:
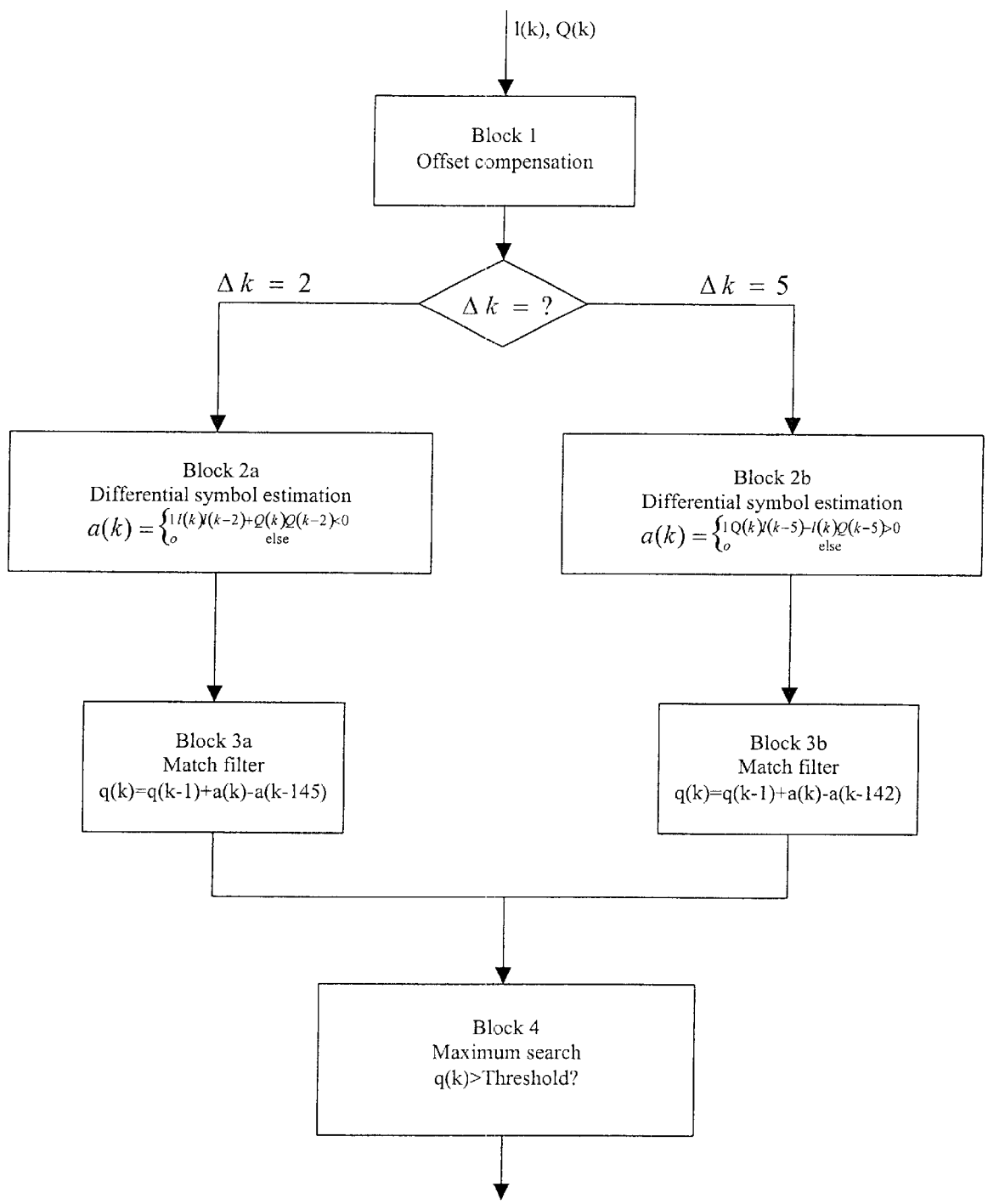
FIG. 2 is a flow chart of the method for detection of pilot tones.

The method according to the invention can prevent this incorrect detection of the FCB signal. FIG. 2 uses a block diagram to show the method according to the invention for detection of pilot tones.

The signal in the channel m to be investigated is sampled at individual times. Each sample Z of the signal received at the time k can in this case be represented, in complex form, as $Z(k)=I(k)+jQ(k)$. In this case, $I(k)$ is the in-phase component of the baseband sample at the time k, and $Q(k)$ is the quadrature component of the baseband sample at the time k.

The two components $I(k)$, $Q(k)$ are subjected to offset compensation in the block 1. This compensates for any possible DC voltage components in the values $I(k)$, $Q(k)$. This may be done, for example, by using a notch filter or blockoriented compensation.

Differential symbol estimation is then carried out in the blocks 2a and 2b. Until now, successive samples $I(k)$, $Q(k)$ have been used for differential symbol estimation. In the undersampling differential symbol estimation process according to the invention, samples located further apart from one another are used to calculate the phase differences. Undersampling is therefore carried out. In general terms, $I(k)$, $Q(k)$ and $I(k-\Delta k)$, $Q(k-\Delta k)$ are used to form the phase differences, where $\Delta k \geq 2$.

Undersampling with $\Delta k=2$ is chosen in the block 2a. To this end, a check is completed to determine whether the phase difference between $I(k)+j*Q(k)$ and $I(k-2)+j*Q(k-2)$ represents a phase difference of $\Delta k*\Pi/2=\Pi$, that is to say whether it is in the interval $(\Pi/2, 3\Pi/2)$. This can be done by a simple check of the value $I(k)*I(k-1)+Q(k)*Q(k-2)$. If this value is less than zero, then the estimated symbol a(k) represents a one. If this value is greater than or equal to zero, then the estimated symbol a(k) represents a zero.

In contrast, undersampling with $\Delta k=5$ is carried out in the block 2b. To this end, a check is carried out to determine whether the phase difference between $I(k)=j*Q(k)$ and $I(k-5)+j*Q(k-5)$ represents a phase difference of $\Delta k*\Pi/2=5*\Pi/2$, which is equivalent to $\Pi/2$, that is to say whether it is in the interval $(0, \Pi/2)$. This may be done by a simple check of the value $Q(k)*I(k-5)-I(k)*Q(k-5)$. If this value is greater than zero, then the estimated symbol a(k) represents a one. If this value is less than or equal to zero, then the estimated symbol a(k) represents a zero.

As already mentioned, such undersampling results in artificially increased overlapping (aliasing) of the residual signal spectra from the adjacent channels. This aliasing effect converts an originally colored residual signal spectrum, which is present without this aliasing effect after filtering using the baseband filter, to an approximately white spectrum. The residual signal thus behaves like white noise and has scarcely any similarity to the FCB signal, so that erroneous detection is avoided.

The actual FCB signal has a narrowband spectrum, which is scarcely influenced by the aliasing effect.

The aliasing effect becomes greater, the larger the chosen value of $\Delta k$. However, on the other hand, there are reasons against choosing an excessively large value for $\Delta k$:

a) An excessively large value of $\Delta k$ also leads to a broad spectrum in the actual FCB signal, which could lead to failure to detect correct FCB signals.

b) The undersampling increases the effect of frequency mistuning. For example, frequency mistuning of 20 kHz implies a phase shift of $(20/270.833)*360°26.60°$ for adjacent (I,Q) values ($\Delta k=1$). If $\Delta k=2$ is chosen, then frequency mistuning of 20 kHz corresponds to a phase shift of $2*26.6°=53.2°$. For this reason, $\Delta k$ should be chosen to be as small as possible so that even FCB signals with major frequency mistuning can be detected correctly.

c) It is necessary to ensure that an FCB signal from the lower adjacent channel (see FIG. 1c) is not shifted by the undersampling process to approximately the same frequency band as an FCB signal in the channel m. In this case, the mobile station that is carrying out the process of detecting the pilot tones would not be able to distinguish FCB signals from the channel m−1 and from the channel m from one another. Such a situation occurs, for example, if $\Delta k=4$.

As can be seen, the requirements mentioned above are partially contradictory. Extensive tests have shown that $\Delta k=2$ and $\Delta k=5$ represent two sensible compromises for GSM/DCS1800/PCS1900 systems.

The choice of $\Delta k=2$, as shown in block 2a in FIG. 2, allows the detection of FCB signals that have major frequency mistuning, and is thus suitable for initial synchronization of a mobile station and base station. However, a small residual risk of adjacent channel interference remains, since the undersampling is not sufficient.

The choice of $\Delta k=5$, as shown in block 2b in FIG. 2, prevents adjacent channel interference completely. Only FCB signals with minor frequency mistuning can be detected here for this reason. This operating mode is therefore particularly highly suitable for monitoring adjacent cells in a mobile radio network during radio operation.

Fading interference can occasionally lead to incorrect symbol estimates in the above checks. For this reason, the estimated symbols a (1 or 0) are filtered using a match filter in the blocks 3a and 3b. This means that a search window of predetermined length L is placed over the estimated symbols. In this case, the number of ones within the search window is counted in the form of a sliding addition process. The formula for this purpose can be expressed as follows:

$$q(k)=q(k-1)+a(k)-a(k-L)$$

where q(k) is the symbol sum, a(k) is the symbol estimated above, and L is the length of the search window. If the FCB signal has 148 zeros, which become 147 ones at the transmission end after differential coding, then L is calculated to be L=148−(Δk+1). Thus, if Δk=2, this results in L=145, as is represented in the block 3a, and if Δk=5, it results in L=142, as is illustrated in the block 3b.

In both cases, the maximum of the symbol sum q(k) formed in the blocks 3a and 3b is then compared with a threshold value S, and the presence of an FCB signal is deduced if the threshold value is exceeded. The position of the FCB signal can then also be deduced from the position of the maximum. For example, the point in time which is between the times at which the symbol sum (q) exceeds the sum threshold value (S) for the first time and for the last time can be quoted as the timing of the sought pulse sequence.

The method according to the invention detects pilot tones. In particular, the method searches for pulse sequences that are referred to as FCB signals, which identify an organization channel in mobile radio systems. The method improves the prior art by being relatively insensitive to interference from adjacent channels.

We claim:

1. A method for identification of a pulse in a signal, which comprises:
    a) obtaining samples of a signal at successive times k, the sample times having a time difference of $\Delta k \geq 2$ between the sample times k, the signal including a pulse sequence having known values 0 and 1 and a known length;
    b) corresponding an estimated symbol "1" to a phase difference of the signal when the phase difference is in a range mod ($\Delta k * \Pi/2.2 - \Pi/2$ to mod ($\Delta k * \Pi/2.2\Pi$)+$\Pi/2$; and corresponding an estimated symbol "0" to the phase difference when the phase difference is not in the range;
    c) filtering the estimated symbols by placing a search window with a search window length equal to the known length of the pulse sequence to be identified minus (Δk+1) over the successively estimated symbols and by in each case forming a symbol sum of the estimated symbols within the search window;
    d) comparing the symbol sum with a sum threshold value; and
    e) indicating a sought pulse sequence and a timing of the sought pulse sequence when the symbol sum is at least equal to the sum threshold value.

2. The method according to claim 1, which further comprises, before carrying out step a), subjecting the samples to DC voltage compensation.

3. The method according to claim 1, wherein Δk equals 2.

4. The method according to claim 1, wherein Δk equals 5.

5. The method according to claim 1, wherein the pulse sequence to be identified is a sequence of 148 zeros.

6. The method according to claim 5, wherein the pulse sequence identifies an organization channel in a mobile radio system.

7. The method according to claim 1, wherein the timing of the sought pulse sequence occurs midway between a first time and last time at which the symbol sum exceeds the sum threshold value.

* * * * *

UNITED STATES PATENT AND TRADEMARK OFFICE
CERTIFICATE OF CORRECTION

| | | |
|---|---|---|
| PATENT NO. | : 6,396,883 B2 | Page 1 of 1 |
| APPLICATION NO. | : 09/930411 | |
| DATED | : May 28, 2002 | |
| INVENTOR(S) | : Bin Yang et al. | |

It is certified that error appears in the above-identified patent and that said Letters Patent is hereby corrected as shown below:

Column 8,

Lines 1-2, "$(\Delta k*\Pi/2.2) - \Pi/2$ to mod $(\Delta k*\Pi/2.2\Pi) + \Pi/2$"

should read:

-- $(\Delta k*\pi/2, 2\pi) - \pi/2$ to mod $(\Delta k*\pi/2, 2\pi) + \pi/2$ --

Signed and Sealed this
Nineteenth Day of June, 2012

David J. Kappos
*Director of the United States Patent and Trademark Office*